April 18, 1939.  W. G. ESSEX  2,154,894
PROCESS FOR RECLAIMING VULCANIZED RUBBER
Filed Feb. 14, 1936
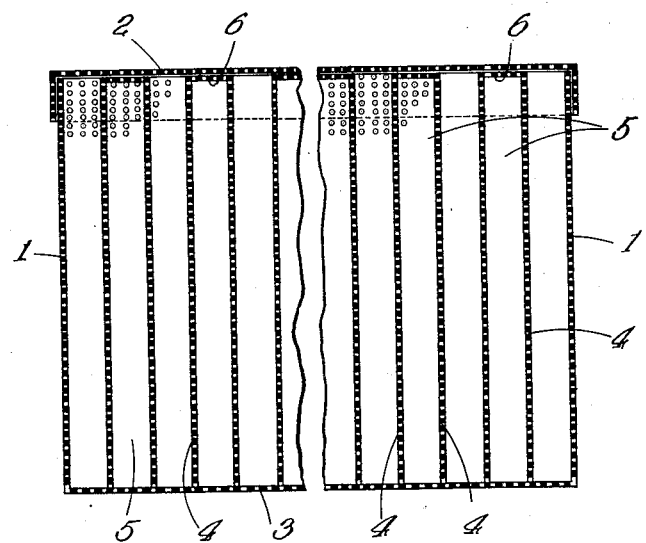
INVENTOR:
WILLIAM GILBERT ESSEX
BY C. F. Wm. Forssberg
ATTORNEY Patented Apr. 18, 1939

2,154,894

UNITED STATES PATENT OFFICE 2,154,894

PROCESS FOR RECLAIMING VULCANIZED RUBBER

William Gilbert Essex, Southport, England

Application February 14, 1936, Serial No. 63,873
In Great Britain February 14, 1935

3 Claims. (Cl. 18—52)

This invention is for improvements in and relating to the regeneration of non-plastic or insufficiently plastic vulcanized rubber, and is applicable to the plasticization of all classes of such rubber, hereinafter referred to as non-plastic scrap.

The standard commercial methods of regenerating non-plastic scrap are the alkali, acid and heater processes. Investigation has shown that heat is the principal factor in effecting a measure of depolymerisation of vulcanized rubber with the result of inducing plasticity in the scrap, and it is believed that the nature of the change from the elastic to the more plastic state, such as occurs from the effect of heat, is common to all the said standard methods of reclaiming.

In the alkali process, ground scrap is heated by steam under pressure to various temperatures in devulcanizers, together with caustic soda solution and softening agents, such, for instance, as oils, solvents and tars. The main action of the alkali is to hydrolise the cellulose and to remove some sulphur, while the heat serves partially to plasticize the scrap, this effect being enhanced by the presence of the softeners.

In the acid process, the scrap is boiled in open vessels with acid solutions which hydrolise the cellulose, and after washing free from excess acid and the products of hydrolysis, the scrap is plasticised by heating, together with softeners, in a devulcanizer with live steam.

The heater process is usually employed for scrap free from cellulose, and consists in heating the scrap in steam in a devulcanizer, usually with the addition of softening agents.

All these processes are usually followed by mechanical treatment on friction rollers, strainers and other devices which serve further to plasticize, to clean and to render more homogeneous the final reclaim.

It is clear, therefore, that in commercial methods for the regeneration of non-plastic scrap there are two common fundamental influences in the production of plasticity:—

(a) The so-called depolymerisation by heat, which induces a partial or latent plasticity:
(b) Mechanical treatment which, aided by the condition produced by heat, renders the rubber still more plastic and completes the process of regeneration.

It seems probable that the action of alkalies, acids and softeners, or combination of such agents, is mainly, although perhaps not wholly, accessory to these two fundamentals and is not itself a primary factor in the art of reclaiming but has been pressed into service to assist their application to scrap containing cellulose; and this belief is supported by the fact that the plasticizing of vulcanized rubber was effected by live steam before the development of the acid or alkali process.

According to the present invention, the manufacture of rubber reclaim is characterised by subjecting non-plastic vulcanized scrap, preferably defabricized when necessary, and in disintegrated solid state to the action of oxygen under heat for the purpose of, and to the degree of heat augmenting, without any substantial desulphurization of the vulcanized material, the plasticizing effect thereon of the raised temperature plasticization of the vulcanized material.

The invention therefore adds a third factor to the two aforesaid fundamentals, namely, the controlled application of oxygen as an agent of depolymerisation of non-plastic scrap, that is to say, non-plastic vulcanized or already partially plasticised vulcanized rubber and particularly the application of oxygen in the presence of water vapor or steam, and the introduction of this third factor results in an improvement both in the yield of reclaim and in substantial economy at the final stage of production.

It is preferred to apply the oxygen in greater concentration than found in the atmosphere, and when this occurs in the presence of the water vapor or steam, the result is particularly satisfactory.

It was observed that vulcanized rubber, such as tyre-scrap, which had not undergone usage or any natural ageing was much less amenable to reclaiming by standard processes than the same material after normal life. The use of antioxidants and of accelerators and improved compounding and vulcanizing technique have very materially decreased the tendency of scrap to pass from the elastic to the plastic state when subjected to heat reclaiming processes. It does not appear that the action of the oxygen involves the formation in situ of rubber degradation products which then function as softeners for the whole body of material, for the process of the invention results in but a very small increase in resinous matter.

In the standard processes, especially the alkali process, but a part of the scrap treated produces reclaim, between 20–30 per cent, being insufficiently plasticized to provide a homogeneous material. This imperfectly plasticized product is discarded as tailings. In the manufacture of reclaim according to the present invention, the amount of tailings may be reduced by 25–50 per cent. The invention also permits of a reduction in the amount of mechanical treatment necessary to obtain the desired plasticity and homogeneity of the reclaim.

It may be that in the course of ordinary reclaiming procedures, such as that of drying in currents of hot air, oxygen may incidentally assist plasticising, but the novelty and utility of the present invention lies in the deliberate and controlled application of oxygen in quantity in excess of that available from mere atmospheric contact expressly for the purpose of promoting an improved plasticity and a condition in the scrap which renders it more economically amenable to mechanical treatment. The application is controlled, as immediately to be explained and as hereinafter exemplified, to the production of a given desired effect by proportioning the oxygen to the charge and by the factors of temperature and time. The influence of oxygen as applied according to the present invention appears to be towards imparting a measure of plasticity to the reclaim over and above that attainable by heat methods alone.

The invention is particularly applicable for use in conjunction with standard processes of reclaiming such as those just described, but may also be applied to nonplastic vulcanized scrap not subjected to treatment with acid or alkali, such for example, as inner tubes and clean sole trimmings.

The oxygen may be applied in any desired manner, and may take the form of air or of a compound which yields oxygen under the conditions of operation. In the generally preferred mode of procedure, the scrap is treated with a mixture of air and steam under pressure. Pressure facilitates and accelerates the process. Moisture is advisable, and seems somewhat to control the action of depolymerization by the oxygen, but the process is also operable in presence of water as such, though not so advantageously. Steam is a convenient means not only of providing the desirable moisture but also of maintaining the heat, so that, ceteris paribus, the maximum required effect of depolymerization may be attained in the minimum time. Steam also tends to swell the rubber and so aids the penetration and the action of the oxygen. The use of the oxygen under pressure furnishes a greater mass of gas per given volume, and permits in a simple manner proportioning of the quantity of oxygen to the quantity of charge. Pressure also assists the penetration of the oxygen into the particles of subdivided rubber. As a general guide, it may be said that with provision as herein described for ensuring adequate access of oxygen to all parts of the material, an air-pressure up to 70 lbs. per sq. in. and steam-pressure up to a total pressure of 100 lbs. per sq. in. over a period of about one to four hours, according to the nature of the stock, give satisfactory results, but, as the examples herein provided show, these factors are variable, and the best operative conditions for a given charge and purpose should be determined by preliminary trial. Generally speaking, as illustrated in the examples, pretreated stock required a substantially shorter treatment by the process of the invention than unpretreated material. Especially important is an adequate supply of the oxidizing gas or, what comes to the same thing, a sufficient pressure thereof, relatively to the charge, and the conditions being determined for a particular case, it may be said that as a rule an increased quantity of material requires for the attainment of the like result a proportional increase in the gas pressure.

By using too much oxygen, or exposing too long in air and steam, the product may become over-plasticized and be lower in elongation and tensile strength in comparison with correctly treated material. For example, the following comparative results were obtained on standard alkali treated tire scrap, washed and dried:

A. Ground twice as described in Example I herein, and treated one hour under 50 lbs. per sq. inch air pressure, brought up to 100 lbs. per sq. inch with live steam.

B. Ground as in A, and treated for 3 hours under 50 lbs. per sq. inch air pressure brought up to 100 lbs. per sq. inch with live steam.

|  | A | B |
| --- | --- | --- |
| Elongation | 420% | 360% |
| Tensile strength | 840 lbs. per sq. in. | 690 lbs. per sq. in. |
| Plasticity 70° C. by Ira Williams Plastometer. | 372 | 324 |
| Recovery | 144 | 94 |

Care is to be observed to ensure penetration of the oxygen throughout the mass of rubber, and especially is this necessary where material in any substantial quantity is treated. A suitable type of apparatus to fulfil this condition is shown herein with reference to the accompanying drawing which illustrates in longitudinal section, a container constructed in accordance with the invention for use with the improved process.

The walls 1, top 2 and bottom 3 of the container are constructed from closely perforated sheet metal, the top being detachable to allow of the insertion of the scrap rubber to be acted upon. The interior of the container is divided by means of a series of closely perforated vertically arranged partitions 4 into a series of compartments into which the material to be treated is placed, each partition having a double wall so as to provide an intervening air space 5 which is closed at its upper end by perforated metal as at 6, to prevent the scrap rubber entering the space when filling the container.

The double walled partitions divide the container into a large number of compartments each containing only a small percentage of the total volume of rubber being treated at one time and consequently the treatment of the rubber is accelerated. The container carrying the scrap rubber is placed in an autoclave or other suitable apparatus where it is subjected to the action of oxygen for example in the form of air which has free access to the mass of scrap rubber through the perforations in the container and its associated partitions, the oxygen thereby penetrating the scrap rubber disposed between the various partitions. The penetration of the mass may as herein provided be facilitated by supplying the air under pressure with if required the addition of moisture for example in the form of steam supplied under pressure. As will be appreciated, the factor of efficient contact between the oxygen and the rubber affects not only the uniformity of the plasticisation but also the time of treatment necessary to obtain the desired result.

The scrap is preferably ground prior to treatment, subdivision increasing uniformity of depolymerization by the oxygen; and grinding and drying are particularly noticeable as advantageous in the treatment of products from the acid and alkali processes.

The invention is particularly applicable for use in conjunction with the standard acid and alkali processes of reclaiming, and when so used is applied as a step subsequent to the heat-stage or heat-stages of defabricizing and partial plasticization by the said respective processes. The invention may also be directly applied to suitable scrap which has not been subjected to treatment with acid or alkali, such, for example, as inner tubes and ground sole waste, and may be used in substitution for, or as a step subsequent to, the known heater process.

In the standard processes, especially the alkali process, but a part of the scrap treated produces reclaim, between 20–30 per cent being insufficiently plasticized to provide an homogenous material. This imperfectly plasticized product is discarded as tailings. In the manufacture of reclaim according to the present invention, the amount of tailings may be reduced by 25–50 per cent; and, as already indicated, the invention also permits of a reduction in the amount of mechanical treatment necessary to obtain the desired plasticity and homogeneity of the reclaim.

The following are examples of ways in which the invention may be carried into effect, and it will be appreciated that these examples are given for purposes of illustration and not in limitation of the invention.

Example I

Motor-tyre covers ground to pass through a riddle with ¾" round holes were heated in known manner with caustic soda solution containing 4 per cent softening agents for 10 hours in a devulcanizer at 150 lbs. per sq. in. steam pressure. The material was washed, dried, and ground twice on friction rollers so that the pieces were flattened out to approximately $25/1000''$ to $50/1000''$ and then subjected to air and steam pressure in a suitable plant as already described herein, so that a free penetration of the air throughout the charge was obtained. Air was first introduced to 70 lbs. per sq. in. pressure, and live steam was then led in up to a total pressure of 100 lbs. per sq. in. which is equivalent to an initial oxygen concentration of about 0.75 per cent relatively to the charge. This total pressure was maintained over a period of 1 hour. The product was then milled, strained and refined in the usual manner. A test on a sample of the finished reclaim gave:

| | |
|---|---|
| Specific gravity | 1.14 |
| Acetone extract per cent | 9.23 |
| Tensile strength kg. per sq. mm | 0.66 |
| Elongation | 460 |

The product therefore possessed the properties of the highest grade of tyre-reclaim from the alkali process, and this result was achieved with a very considerable economy in milling, straining and refining. It has been found that according to the nature of the primary material the saving on this final stage—the most expensive of the reclaiming operations—may be from 25–75 per cent. The succeeding example is specific in illustration of the economy effected in this respect in comparison of the invention with the standard procedure.

Example II

Standard alkali process

A total charge as follows:

| | | |
|---|---|---|
| Ground motor-tyre covers | lbs | 50,000 |
| Caustic soda solution (17 p. c.) | gals | 3,000 |
| Oils | | 4,500 | was heated in 5 equal portions in devulcanizers with live steam to 150 lbs. per sq. in. pressure for 15 hours. The product was washed and dried and then submitted in known manner to mechanical treatment for completion of the reclaiming process. The following are the economic data appertaining to this mechanical stage:

| | Pounds per hour per machine |
|---|---|
| Milling output equals | 108 |
| Straining output equals | 753 |
| Refining output equals | 84 |

The process of the invention

A total charge as follows:

| | | |
|---|---|---|
| Ground motor-tyre covers | lbs | 50,000 |
| Caustic soda solution (17 p. c.) | gals | 3,000 |
| Oils | lbs | 3,000 | was heated in 5 equal portions in devulcanizers with live steam to 150 lbs. per sq. in. for 10 hours. The product was washed and dried, ground so that the pieces were flattened out to approximately $25/1000''$ to $50/1000''$ by leading twice through a high-speed friction mill with tight rollers, loaded into containers as in Example I in loads of about 800 lbs. each, and then heated for 1 hour in an autoclave for example, under 40 lbs. per sq. in. air-pressure brought up to 80 lbs. per sq. in. with live steam, equivalent to an initial temperature of about 133° C., and to an oxygen concentration of approximately 0.73 per cent relatively to the charge. The product was finally subjected to mechanical treatment as in the standard process, the following being the data for this concluding stage:

| | Pounds per hour per machine |
|---|---|
| Milling output equals | 201 |
| Straining output equals | 1095 |
| Refining output equals | 136 |

The following example is of a procedure which eliminates the grinding after drying described in the example just given.

Example III

A charge as follows:

| | | |
|---|---|---|
| Ground motor-tyre covers | lbs | 10,000 |
| Caustic soda solution (17 p. c.) | gals | 600 |
| Oils | lbs | 600 | was heated with live steam at 150 lbs per sq. in. pressure for 10 hours in a devulcanizer of the aforesaid type. The product, after being washed was then heated in the same vessel for 4 hours under an air-pressure of 60 lbs. per. sq. in. brought up to 75 lbs. per sq. in. with live steam which is equivalent to an initial oxygen concentration of about 0.45 per cent relatively to the charge. After drying, the material was submitted to mechanical treatment, with the following results:

| | Pounds per hour per machine |
|---|---|
| Milling output equals | 192 |
| Straining output equals | 998 |
| Refining output equals | 121 |

It will be observed that, although this procedure did not give so satisfactory results as those from material previously ground and dried, the effect of the oxygen was markedly to improved production.

EXAMPLE IV

Air at atmospheric pressure was passed for 8 hours into boiling water containing strap from large-section motor-tyre covers which had been previously treated by the standard alkali process, then washed dried and twice ground. The following results were obtained:

|  | Pounds per hour per machine |
|---|---|
| Milling output equals | 133 |
| Straining output equals | 975 |
| Refining output equals | 122 |

EXAMPLE V

Like scrap, subsequent to treatment by the alkali process and grinding twice after drying, was covered with water and the mixture boiled for 5 hours at the ordinary pressure. The water was then drained off, 3 per cent. of sodium perborate added and the mixture heated with live steam at a pressure of 30 lbs. per sq. in. equivalent to a temperature of about 134° C., for 3 hours. The product was dried, and gave for the mechanical stage the following data:

|  | Pounds per hour per machine |
|---|---|
| Milling output equals | 131 |
| Straining output equals | 975 |
| Refining output equals | 114.5 |

It is known in the art that even severe treatment of vulcanized rubber with oxygen (300 lbs. per sq. in. at 60° C. for 16 hours) serves only to remove the merest traces of sulphur, (T. R. Dawson and B. D. Porritt. "Rubber, Physical and Chemical Properties," p. 196. Table 566). Hence, plasticization as carried out in the present invention need not involve any severe chemical action on the rubber, and of course any predetermined removal of sulphur does not enter into consideration.

The autoclave was then recharged with 4,500 lbs. of the same tire-stock pre-treated precisely as the first charge, and the material was submitted for the same period of time to an air-pressure of 90 lbs. per sq. in. brought up to a total pressure of 150 lbs. per. sq. in. with steam, equivalent to an initial temperature of about 140° C., and to an initial oxygen concentration of the same order as before.

On mechanical finishing, the material of both charges fulfilled the conditions of the same specification.

The previous examples show the advantages of the invention applied to vulcanized waste which has been treated by the alkali process. The following examples illustrate the results obtained in application of the invention to waste not already so treated.

EXAMPLE VI

Red inner tyre tubes were cut up, and ground fine so as to pass through an 8-mesh woven wire sieve subjected under the conditions already outlined herein to an air-pressure of 40 lbs. per sq. in. raised by live steam to a total pressure of 80 lbs. per sq. in. for a period of four hours. The resulting product was dried and mechanically finished in the usual way. It was of good colour, soft and plastic. The milling and refining output were respectively 294 lbs. and 86 lbs. per hour per machine.

EXAMPLE VII

Ground sole waste, which had been brought to a fineness to pass a 16-mesh woven wire screen and was then treated precisely in the manner of the immediately preceding example. The product was likewise good in quality, soft and plastic. The milling output was 240 lbs. and the refining output 83 lbs. per hour per machine.

What I claim and desire to secure by Letters Patent of the United States is—:

1. The process of regenerating vulcanized rubber preferably free from fibre, which consists in treating said rubber by heating at a temperature above that of boiling water in the presence of water vapor in an atmosphere embodying oxygen at a higher pressure and concentration per square inch than normally found in the atmosphere for a period of time sufficient to produce plasticization.

2. The process of regenerating vulcanized rubber preferably free from fibre, which consists in treating said rubber by heat at a temperature above that of boiling water in the presence of water vapor in an atmosphere embodying oxygen at a pressure ranging from above the atmospheric to 70 lbs. per square inches, and bringing said pressure up to a range between 30 and 100 lbs. total by means of steam introduced under pressure and maintaining said temperature and pressure for a period of time ranging from one to eight hours.

3. The process of regenerating vulcanized rubber preferably free from fibre, which consists in treating said rubber by heat at a temperature above that of boiling water in the presence of water vapor in an atmosphere embodying oxygen at a pressure ranging from 40 to 70 lbs. per square inches, bringing the pressure up to a range of 75 to 100 lbs. total per square inches, by introducing steam, and maintaining the pressure and temperature for a period of time ranging from one to four hours.

WILLIAM GILBERT ESSEX.